July 24, 1923.

M. J. ABBOTT

MACHINE FOR TREATING FISH

Original Filed Dec. 10, 1917    6 Sheets-Sheet 1

1,463,111

INVENTOR
M. J. Abbott
BY
H. N. Low
ATTORNEY

July 24, 1923.

M. J. ABBOTT 1,463,111

MACHINE FOR TREATING FISH

Original Filed Dec. 10, 1917

INVENTOR
M. J. Abbott.
BY
H. N. Low
ATTORNEY

July 24, 1923.
M. J. ABBOTT
1,463,111
MACHINE FOR TREATING FISH
Original Filed Dec. 10, 1917
6 Sheets-Sheet 4

INVENTOR
M. J. Abbott
BY
H N Low
ATTORNEY

July 24, 1923.

M. J. ABBOTT

MACHINE FOR TREATING FISH

Original Filed Dec. 10, 1917

INVENTOR
M. J. Abbott.
BY
H. N. Low
ATTORNEY

July 24, 1923.

M. J. ABBOTT 1,463,111

MACHINE FOR TREATING FISH

Original Filed Dec. 10, 1917   6 Sheets-Sheet 6

INVENTOR
M. J. Abbott.
BY
H N Low
ATTORNEY

Patented July 24, 1923.

1,463,111

UNITED STATES PATENT OFFICE.

MAURICE J. ABBOTT, OF NEW YORK, N. Y., ASSIGNOR TO AMERICAN CAN COMPANY, OF NEW YORK, N. Y., A CORPORATION OF NEW JERSEY.

MACHINE FOR TREATING FISH.

Application filed December 10, 1917, Serial No. 206,517. Renewed January 8, 1923.

*To all whom it may concern:*

Be it known that I, MAURICE J. ABBOTT, a citizen of the United States, residing at New York, in the county of New York and State of New York, have invented certain new and useful Improvements in Machines for Treating Fish, of which the following is a specification.

The invention relates to the cutting and decapitation of fish. It also relates to the evisceration of fish whether or not the same are positioned and decapitated by the particular means herein set forth. The invention has for its objects to rapidly and accurately cause the feeding of the fish head first to a decapitating position, to accurately position the fish for decapitation, to cut off the heads of the fish at the proper line of severance, to withdraw the viscera from the decapitated fish, and to discharge the fish, the heads and the viscera in a suitable manner.

With such object in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions, which, for the purpose of explanation, have been made the subject of illustration. In the said drawings:—

Figure 1:
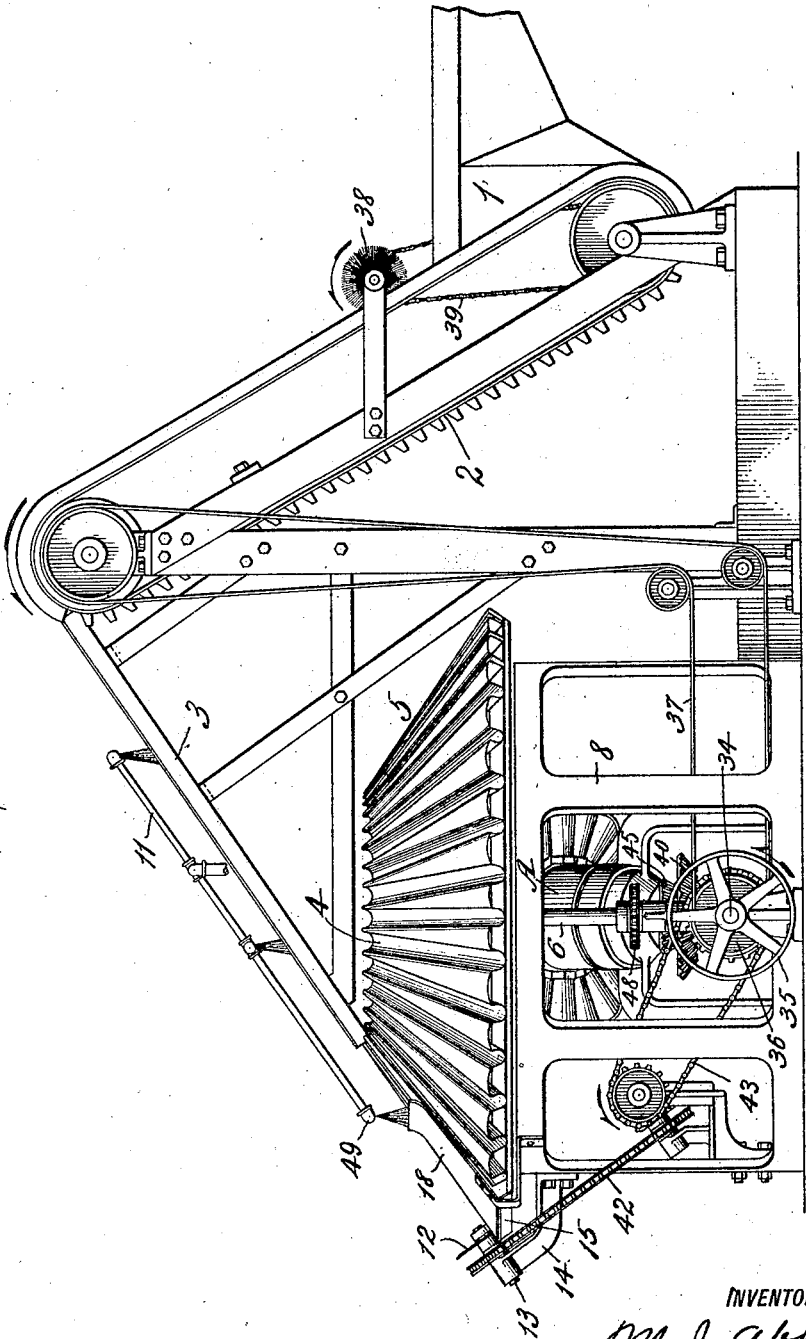
Fig. 1 is a side view of a fish-selecting, feeding, decapitating and eviscerating machine embodying the invention.

Referring to the drawings, the fish are deposited in a mass in a hopper 1 from which they are selected, ordinarily one by one, by the flights or conveyer 2 and deposited on a positioning slide 3 on which latter the fish, by gravity and some resistance to sliding automatically turn head first and are discharged substantially one by one from the lower end of said slide. This selecting and positioning apparatus is or may be similar to that shown in the patent to William F. Butler #1,246,942, dated Nov. 20, 1917, and does not require further description herein; and means other than those above described may be employed for delivering the fish to the cutting and eviscerating mechanism, not including the feeding of the fish by hand.

As the fish leave the slide 3 head first they are received successively in inclined channels 4 formed by a sheet of corrugated metal, or by other suitable means on the upper surface of a rotary frusto-conical carrier or turret 5. The carrier is fixed on a substantially vertical shaft 6 (Fig. 4) having its lower end mounted in a bearing 7 carried by a frame 8. Said frame, which is or may be cylindrical, has around its upper edge a grooved track 9 in which work rollers 10 journaled in the end part of the carrier. A spray or sprays of water may be employed to wet the fish and maintain them in a slippery condition in case they are not sufficiently wet as they are fed to the slide 3, said water being supplied from a pipe 11. The channels 4 may be of the same inclination as the slide 3 or of the other suitable inclination.

12 is a rotary decapitating knife fixed on a shaft 13, the latter being mounted in a frame bracket 14 at such angle that the knife is at substantially right angles to the channels 4, and the fish passing head first down said channel and having their heads arrested by a guage 15 which is arranged a little beyond the lower ends of the channels, are carried against the knife 12 and decapitated, the heads 16 (Fig. 3) falling into a receptacle 17, through a chute 17'.

Figure 2:
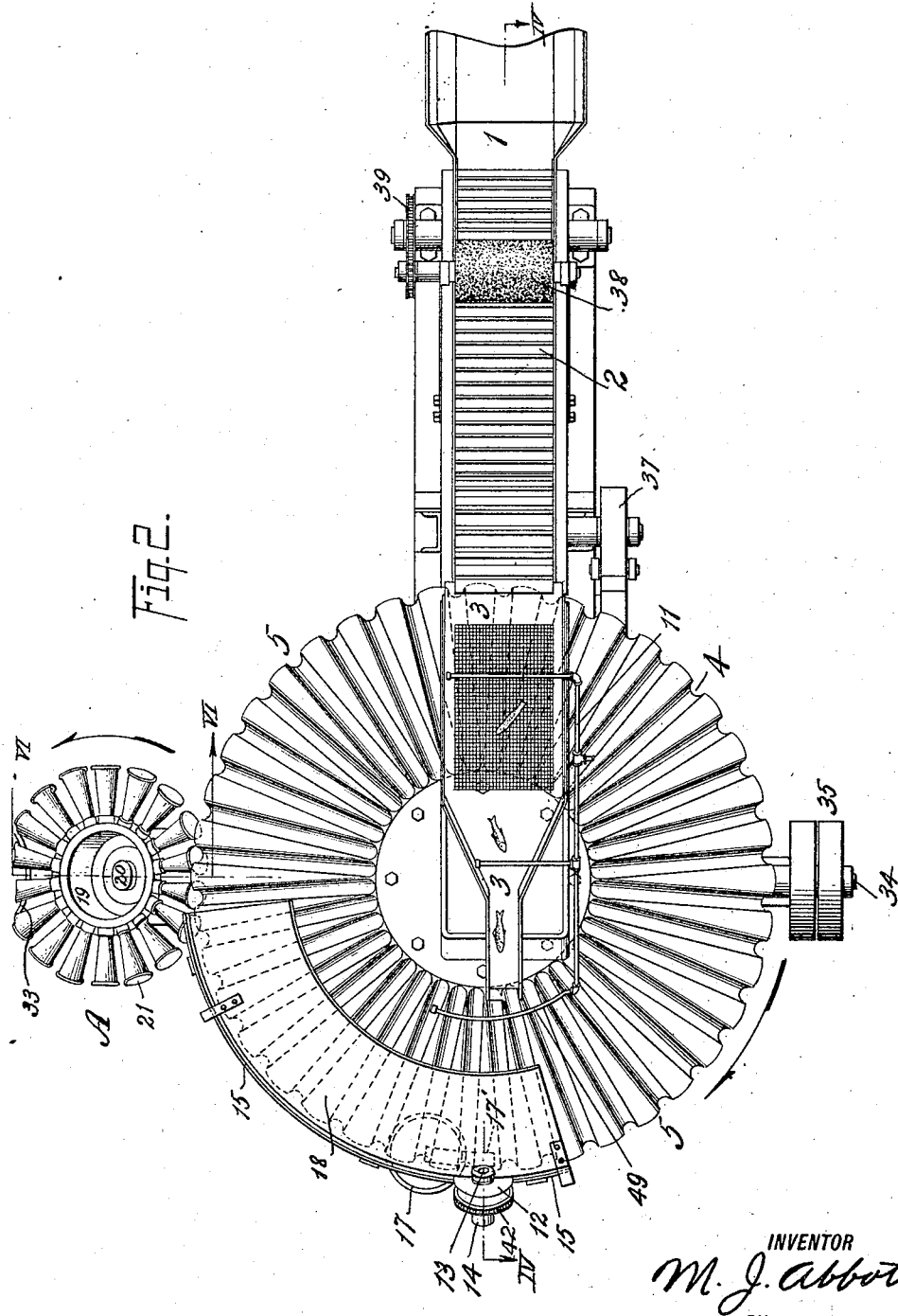
Fig. 2 is a plan view of the same.
Figure 3:
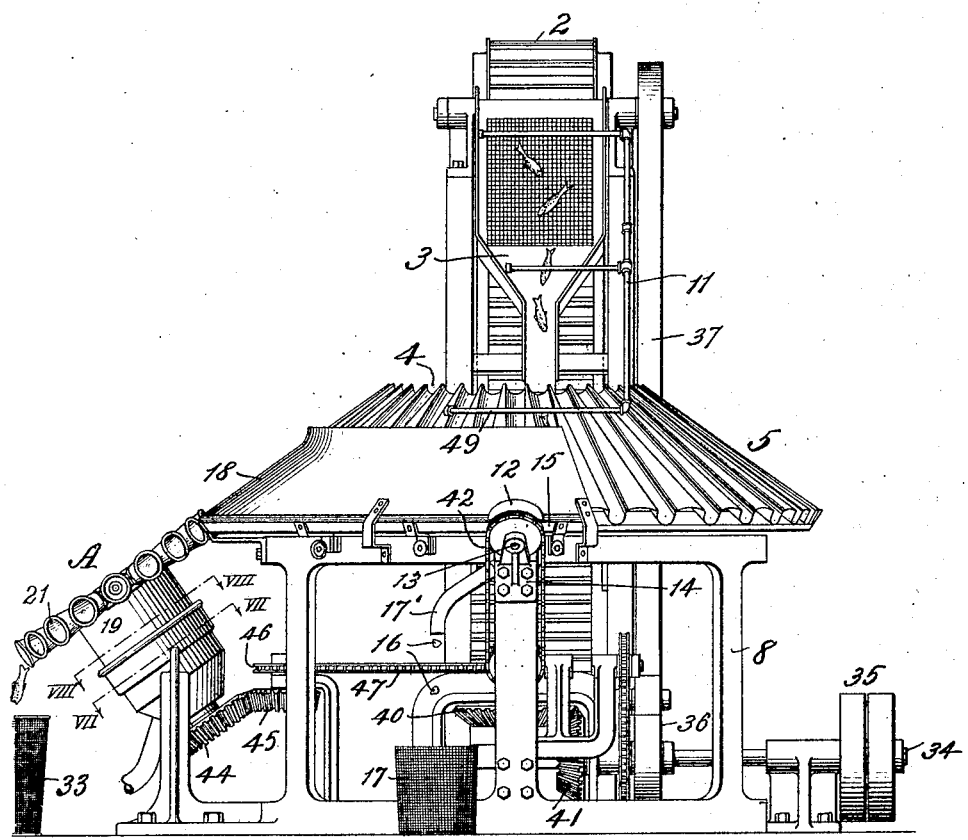
Fig. 3 is an end view.
Figure 5:
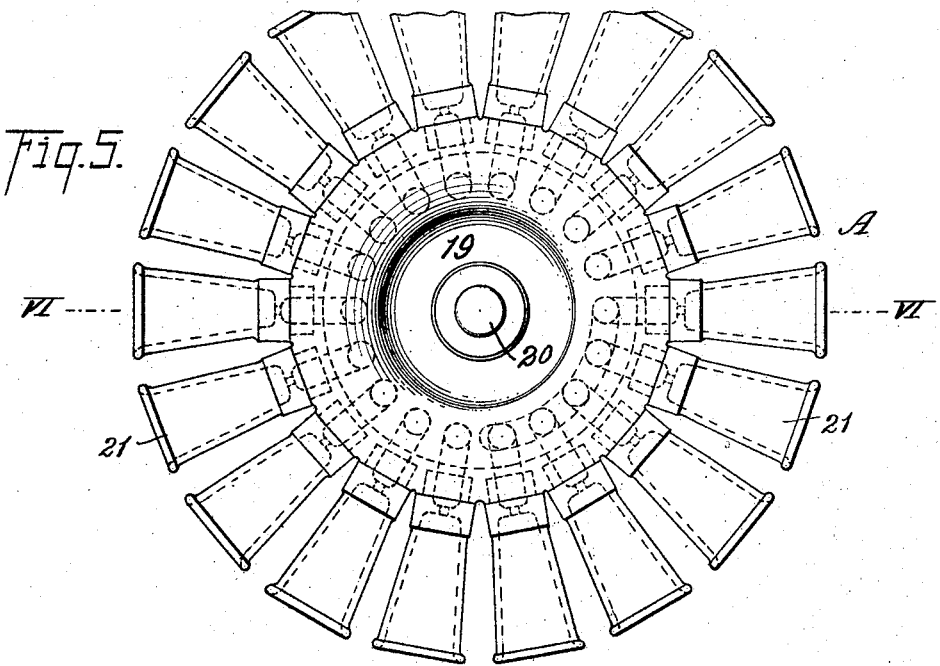
Fig. 5 is a plan view on a larger scale of the eviscerating part of the mechanism.
Figure 6:
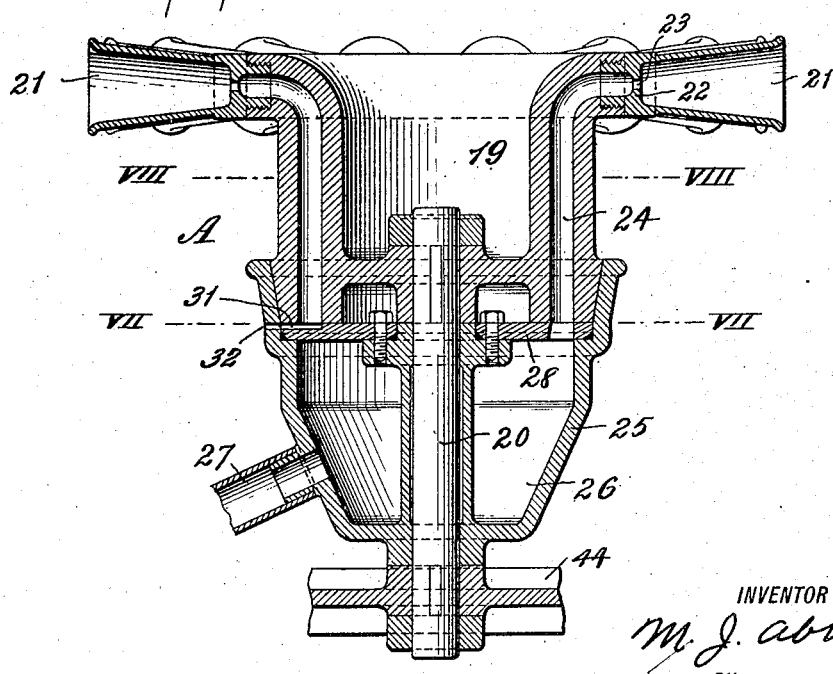
Fig. 6 is a vertical sectional view on line VI—VI of Figs. 2 and 5.
Figure 8:
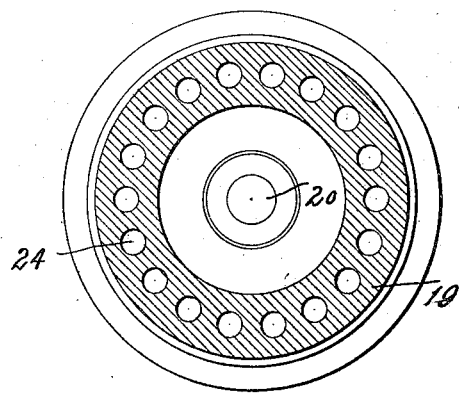
Fig. 8 is a sectional view on line VIII—VIII of Figs. 3 and 6.
Figure 7:
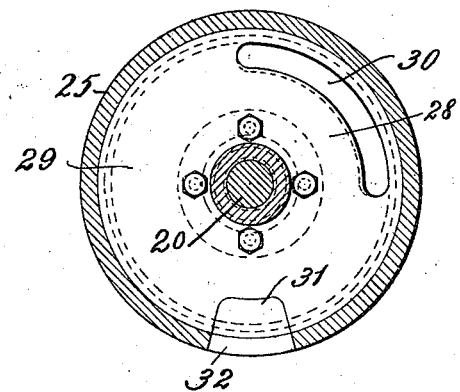
Fig. 7 is a sectional view on line VII—VII of Figs. 3 and 6.

The bodies of the fish remain in said channels 4 and are carried around to the eviscerating device A. 18 is a guard or shield arranged over the lower portion of the carrier and extending from about the point where the fish are gauged to said eviscerating device (Fig. 2). The eviscerating device is preferably of turret type, having an upper rotary part 19 fixed on an inclined shaft 20 (Fig. 6) in such manner that the eviscerator cups 21 are presented endwise to the channels 4 to receive the decapitated fish as soon as the latter are released by the continuation of the gauge 15 which extends around to the eviscerator. It will be understood that the rotary part of the eviscerator turns in time with the feeding turret 5 so that the cups 21 properly register with the channels 4. The cups 21, which are preferably conical, are secured to the part 19 so as to extend radially therefrom (Fig. 5), and each cup has at its inner end a partition 22, (Fig. 6), which arrests the body of the fish before it presents the viscera to an opening 23 formed through said partition. Each opening 23 communicates with a duct 24 leading inward and down to the non-rotary part 25 of the eviscerator A and into an exhaust chamber 26 thereof. This chamber communicates by a suction pipe or hose 27 with other suitable apparatus not shown which provides a strong air suction through the pipe and for the deposit of the collected viscera which are also taken away through said pipe. The parts 19 and 25 of the eviscerating device are separated by a fixed cut-off plate 28 which may be bolted as shown (Fig. 6) to the part 25. This cut-off plate has an imperforate wall at 29 (Fig. 7) and when the lower ends of the passages 24 are turning around above this wall they are cut off from the action of the suction device. The cut-off plate is provided with an elongated slot or opening 30 by which the ducts 24 communicate with the suction chamber 26 for a long enough space of time to enable the viscera to be removed from the fish. At 31 said plate is formed with a recess which communicates by an opening 32 with the atmosphere; so that all of the passages 24 are restored to atmospheric pressure when the eviscerated fish have arrived at a proper point to be discharged, at which point is arranged a receptacle 33 for the bodies of the eviscerated fish, into which they are discharged as indicated in Fig. 3.

Figure 4:
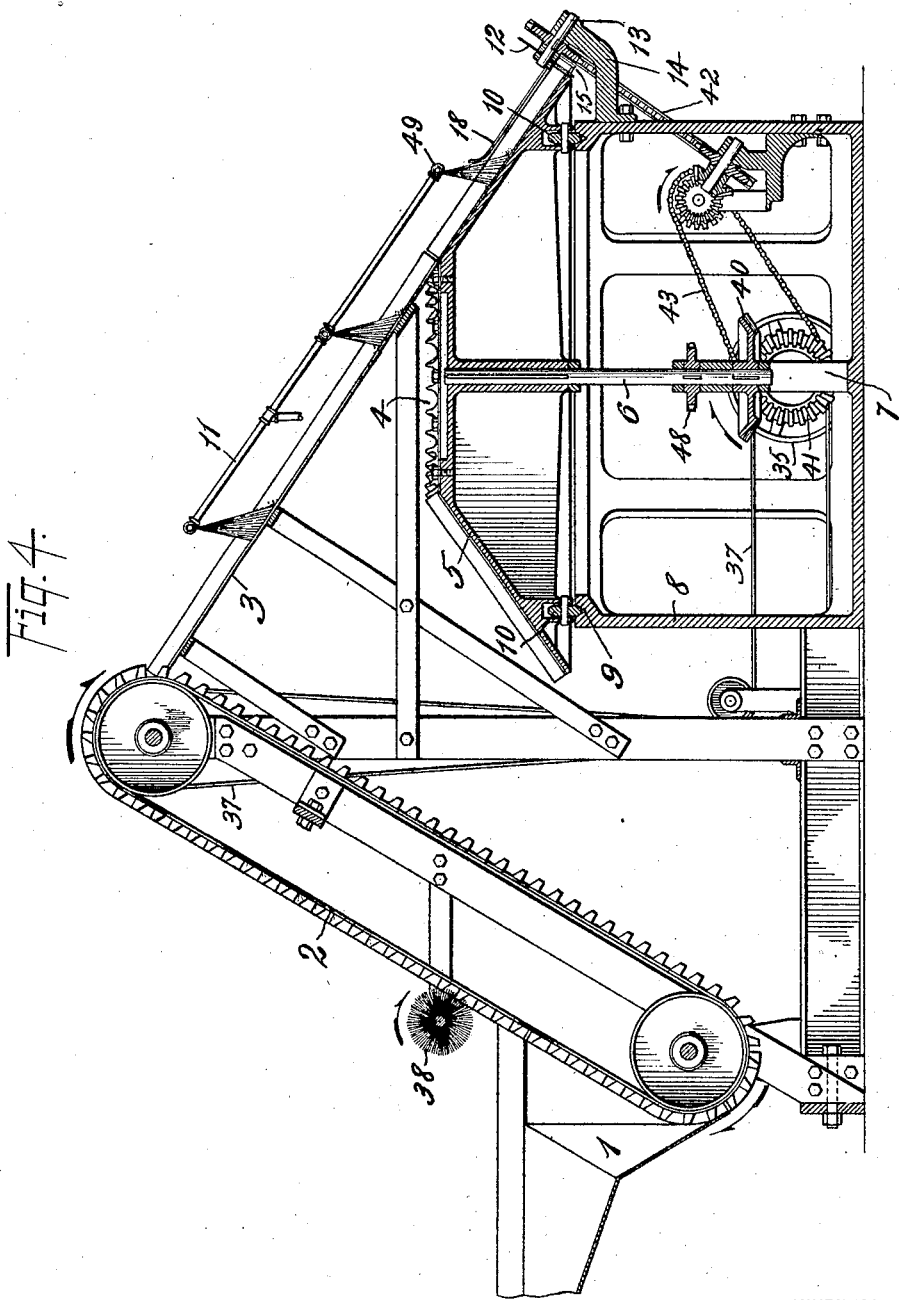
Fig. 4 is a vertical sectional view on line IV—IV of Fig. 2.

Suitable driving mechanism is provided for the various movable parts above described, but this may vary considerably in detail. In the form of machine illustrated it is provided with a main drive shaft 34 having fixed thereon fast and loose pulleys 35. Fixed on said shaft is a pulley 36 from which the elevator 2 is driven by a belt 37. The lower part of the elevator drives a fish inserting and cleaning brush 38 by a chain 39. The shaft 6 of the carrier 5 has fixed thereon a bevel gear 40 which meshes with a similar gear 41 on said main shaft (Fig. 4). The decapitating knife 12 is driven by chains 42 and 43, and suitable gearing, from said main shaft (Fig. 4). The inclined shaft 20 of the eviscerator A has fixed thereon a gear wheel 44 (Fig. 6) which meshes with a gear 45 mounted on the main frame (Fig. 3). This latter gear has fixed on its shaft a sprocket 46 which is connected by a drive chain 47 with a sprocket 48 fixed on the gear shaft 6 (Fig. 4).

Provision may be made for washing the rotary slide and carrier 5 to keep the same free from scales and dirt, and in the construction illustrated this is accomplished by a spray of water from a pipe 49, which is or may be a branch of the pipe 11.

The rotary movement of said carrier and slide is or may be sufficiently rapid to give the fish a centrifugal tendency of movement in which case the final positioning movement of the fish against the gauge is promoted and made certain, and such centrifugal tendency loosens the engagement of the fish in the channels 4 so that their free sliding is insured.

The machine may be used only for the decapitation of fish, in which case the eviscerator would be omitted or not operated, and the eviscerator may be employed with suitable fish-feeding devices other than those set forth, or cut fish could be fed by hand to the eviscerator.

What I claim is:

1. In a fish positioning machine, a rotatable carrier having downwardly and outwardly extending fish-guiding devices whereby centrifugal tendency is imparted to the fish to promote their sliding away from the axis of rotation, and means for automatically positioning the fish head first and delivering them in that direction at the inner ends of said guiding devices.

2. In a fish positioning machine, a rotatable carrier having guides for the fish extending in substantially radial directions, and means for automatically positioning the fish head first and delivering them in that direction at the inner ends of said guides.

3. In a fish positioning machine, a rotatable carrier having downwardly inclined guides for the fish, said guides having also a substantially radial arrangement, and means for automatically positioning the fish head first and delivering them in that direction at the inner ends of said guides.

4. In a fish positioning machine, a rotatable carrier having downwardly and outwardly extending fish-guiding devices, combined with an air exhausted eviscerator to which the fish are delivered from said guiding devices.

5. In a fish positioning machine, a rotatable carrier having downwardly inclined guides for the fish, said guides having also a substantially radial arrangement, combined with an eviscerator to which the fish are caused to slide from said guides of the carrier.

6. In a fish positioning machine, a rotatable carrier having guides for the fish extending in substantially radial directions, combined with an eviscerator to which the fish are caused to slide from said guides of the carrier.

7. In a fish positioning machine, a rotatable carrier having guides for the fish extending in substantially radial directions, combined with a gauge near the outer ends of said guides, a decapitating knife, and means for positioning fish head-first relative to said guides.

8. In a fish positioning machine, a rotatable carrier moving around a substantially upright axis and having downwardly inclined guides for the fish, said guides having also a substantially radial arrangement, combined with a gauge near the outer ends of said guides, a decapitating knife, and means for positioning fish head-first relative to said guides.

9. In a fish positioning machine, a rotatable carrier of substantially conical form having downwardly and outwardly extending fish-guiding devices arranged on the conical surface of said carrier, combined with a gauge near the outer ends of said guiding devices, a decapitating knife, and means for positioning fish head first relative to said guiding devices.

10. In a fish positioning machine, a rotatable carrier having guides for the fish extending in substantially radial directions, combined with a gauge near the outer ends of said guides, a decapitating knife and an eviscerator to which the decapitated fish are delivered from said guides.

11. In a fish positioning machine, a rotatable carried having downwardly inclined guides for the fish, said guides having also a substantially radial arrangement, combined with a gauge near the outer ends of said guides, a decapitating knife and an eviscerator to which the decapitated fish are delivered from said guides.

12. In a fish positioning macihne, a rotatable carrier having downward and outwardly extending guiding devices to direct the sliding of the fish, and a carrier for depositing fish successively at the inner ends of said guiding devices, combined with a gauge near the outer ends of said guiding devices, decapitating means, and an eviscerator to which the decapitated fish are delivered from said guiding devices.

13. In a machine for treating fish, the combination of means for feeding the fish, a rotary fish positioning device adapted to receive the fish as fed near the axis thereof and having a centrifugal action to promote the sliding of the fish away from said axis, a carrier for depositing fish successively near the axis of said positioning device, and means remote from said axis for receiving the fish when delivered head first.

14. In a machine for treating fish, the combination of means for feeding the fish, a rotary fish positioning device adapted to receive the fish so fed near the axis thereof and having a centrifugal action to promote the sliding of the fish away from said axis, a carrier for depositing fish successively near the axis of said positioning device, a gauge remote from said axis for arresting the fish, and decapitating means.

15. In a machine for treating fish, the combination of means for feeding the fish, a rotary fish positioning device adapted to receive the fish so fed near the axis thereof and having a centrifugal action to promote the sliding of the fish away from said axis, a gauge remote from said axis for arresting the fish, decapitating means, and a rotary eviscerator to which the decapitated fish are delivered from said rotary positioning device.

16. In a machine for treating fish, the combination of means for feeding the fish, a rotary fish positioning device having fish guides adapted to receive the fish so fed near the axis of rotation and having a centrifugal action to promote the sliding of the fish away from said axis, a gauge remote from said axis for receiving the fish when delivered head first, decapitating means, a rotary eviscerator having fish receptacles which are caused to register with said fish guides, and means for causing a partial vacuum in said eviscerator.

17. In a machine for treating fish, the combination of means for feeding the fish, a rotary fish positioning device having fish guides adapted to receive the fish so fed near the axis of said device and having a centrifugal action to promote the sliding of the fish away from said axis, and an eviscerator remote from said axis for receiving the fish.

18. In a machine for treating fish, the combination of means for feeding the fish head foremost, a rotary carrier having downwardly and outwardly inclined fish-guiding channels which automatically receive the fish which are so fed, a gauge for arresting the fish in position to be cut, a decapitating knife arranged to operate on the arrested fish, a rotary eviscerator to which the bodies of the fish are fed from said carrier, and means for rotating the eviscerator in time with said carrier to receive the decapitated fish from said channels successively.

19. In a machine for treating fish, the combination of means for feeding the fish head foremost, a rotary carrier having downwardly and outwardly inclined fish-guiding channels radiating from a feeding center which automatically receive the fish which are so fed, a gauge for arresting the fish in position to be cut, a decapitating knife arranged to operate on the arrested fish, an eviscerator to which the bodies of the fish are fed from said carrier, and means for maintaining the decapitated fish on the carrier while being moved by said carrier to the eviscerator.

20. In a machine for treating fish, the combination of means for feeding the fish head foremost, a rotary carrier having downwardly and outwardly inclined fish-guiding channels which automatically receive the fish which are so fed, a gauge for arresting the fish in position to be cut, a decapitating knife arranged to operate on the arrested fish, and a rotary eviscerator to which the bodies of the fish are fed from said carrier, said eviscerator having an inclined axis of rotation and operating to receive the fish at its higher side and to discharge the eviscerated fish at the lower side.

21. In a machine for treating fish, the combination of means for feeding the fish head foremost, a rotary carrier having downwardly and outwardly inclined fish-guiding channels which automatically receive the fish which are so fed, a gauge for arresting the fish in position to be cut, a decapitating knife arranged to operate on the arrested fish, a rotary eviscerator having individual receptacles to which the bodies of the fish are fed from said carrier, and means for causing internal air exhaust and external atmospheric pressure to act periodically on the fish in said receptacles.

22. The combination of a fixed inclined slide, an intermediate rotary slide, a rotary eviscerator having receptacles into which the fish continue their sliding movement, means for cooperatively rotating said intermediate slide and eviscerator, and decapitating means to which the fish are carried by said rotary slide.

23. In a machine for treating fish, the combination of a rotary slide and carrier having radially extending guides wherein the fish are received and directed to the lower and outer ends of said guides, a rotary eviscerator having fish receptacles adapted to register endwise with said guides and into which cut fish pass from said guides, means for arresting the bodies of the fish in said receptacles, means for producing an air exhaust to remove the viscera from the fish while the latter are so arrested, and means for rotating said eviscerator to cause its receptacles to successively register with the guides on said rotary slide.

24. In a machine for treating fish, the combination of a rotary slide and carrier having downwardly and radially extending guides wherein the fish are received and directed to the lower and outer ends of said guides, a rotary eviscerator having fish receptacles into which cut fish pass by a further sliding movement, means for arresting the bodies of the fish in said receptacles, means for producing an air exhaust to remove the viscera from the fish while the latter are so arrested, means for interrupting said exhaust for the discharge of the fish bodies, and means for rotating said eviscerator to cause its receptacles to successively register with the guides on said rotary slide.

25. In a machine for treating fish, the combination of a rotary slide and carrier having downwardly and radially extending guides wherein the fish are received and directed to the lower and outer ends of said guides, a gauge arranged near the last mentioned point for arresting the fish, decapitating means arranged to operate on the fish while so gauged, a rotary eviscerator having fish receptacles into which the decapitated fish pass by a further sliding movement, means for arresting the fish in said receptacles, means for producing an air exhaust to remove the viscera from the fish while the latter are so arrested, and means for rotating said eviscerator to cause its receptacles to successively register with the guides on said rotary slide.

26. In a machine for treating fish, the combination of a fixed slide whereon the fish are automatically positioned with their heads in the direction of sliding, a second rotary slide and carrier having radially extending guides wherein the fish are received from the first slide and directed to the lower and outer ends of said guides, a rotary eviscerator having fish receptacles adapted to register endwise with said guides and into which cut fish pass by a further sliding movement, means for arresting the bodies of the fish in said receptacles, means for producing an air exhaust to remove the viscera from the fish while the latter are so arrested, and means for rotating said eviscerator to cause its receptacles to successively register with the guides on said rotary slide.

27. In a machine for treating fish, the combination of a fixed slide whereon the fish are automatically positioned with their heads in the direction of sliding, a second rotary slide and carrier having downwardly and radially extending guides wherein the fish are received from the first slide and directed to the lower and outer ends of said guides, a gauge arranged near the last mentioned point for arresting the fish, decapitating means arranged to operate on the fish while so gauged, a rotary eviscerator having fish receptacles into which the decapitated fish pass by a further sliding movement, means for arresting the fish in said receptacles, means for producing an air exhaust to remove the viscera from the fish while the latter are so arrested, and means for rotating said eviscerator to cause its receptacles to successively register with the guides on said rotary slide.

28. In a machine for treating fish, a rotary eviscerator having radially directed receptacles adapted to receive cut fish successively, and a duct for withdrawing air from the eviscerator during a prolonged part of its rotation to extract the viscera from the fish.

29. In a machine for treating fish, the combination of means for feeding fish prepared for evisceration, a rotary eviscerator having radially arranged fish receptacles adapted to receive such fish successively, and a duct for withdrawing air from the eviscerator to extract the viscera from the fish.

30. In a machine for treating fish, the combination of means for feeding fish prepared for evisceration, an eviscerator having radially arranged fish receptacles adapted to receive such fish successively, and a duct for withdrawing the air from the eviscerator intermittently to extract the viscera from the fish.

31. In a machine for treating fish, the combination of means for feeding fish prepared for evisceration, a rotary eviscerator having radially directed receptacles adapted to receive such fish successively, and a duct for withdrawing air from the eviscerator while rotating to extract the viscera from the fish.

32. In a machine for treating fish, the combination of means for feeding fish prepared for evisceration, a rotary eviscerator having an inclined axis of rotation and radially directed receptacles adapted to receive such fish successively at its higher side, a duct for withdrawing air from the eviscerator while rotating to extract the viscera from the fish, and means for interrupting the withdrawal of air from such receptacles as are at the lower side of the eviscerator.

33. In a machine for treating fish, an eviscerator comprising a rotary part having air ducts and radially arranged fish receptacles at the outer ends of said ducts, a non-rotary part having an air space, means for periodically connecting and cutting off said air ducts with and from said air space, and a main air duct communicating with said space through which duct air may be exhausted.

34. A fish positioning and eviscerating apparatus having a guideway for the fish, a rotary carrier which carries the first part of said guideway, a rotary device which carries the second part of said guideway, means for rotating said carrier and devices whereby said parts of the guideway are periodically aligned, decapitating means arranged to operate on fish in said first part of the guideway, and eviscerating means operating in conjunction with said second part of the guideway.

In testimony whereof I affix my signature hereto.

MAURICE J. ABBOTT.